United States Patent
Jafri et al.

(10) Patent No.: US 8,367,767 B1
(45) Date of Patent: Feb. 5, 2013

(54) FRICTION LINING FOR WET CLUTCH

(75) Inventors: Firoz Jafri, Wooster, OH (US); Martin Fuss, Wooster, OH (US); Michael Wilfong, Burbank, OH (US)

(73) Assignee: Schaeffler Technologies AG & Co., KG, Herzogenaurach (DE)

( * ) Notice: Subject to any disclaimer, the term of this patent is extended or adjusted under 35 U.S.C. 154(b) by 326 days.

(21) Appl. No.: 12/715,161

(22) Filed: Mar. 1, 2010

Related U.S. Application Data

(60) Provisional application No. 61/208,747, filed on Feb. 27, 2009.

(51) Int. Cl.
  *C08K 3/34* (2006.01)
  *C08G 69/32* (2006.01)
  *C08J 5/14* (2006.01)
  *C08J 5/12* (2006.01)
  *C08J 5/10* (2006.01)

(52) U.S. Cl. .......... 524/602; 524/15; 524/450; 524/876; 523/149; 523/156; 523/157

(58) Field of Classification Search .................... 524/15, 524/450, 602, 876; 523/149, 156, 157
See application file for complete search history.

(56) References Cited

U.S. PATENT DOCUMENTS

| | | | | |
|---|---|---|---|---|
| 3,684,062 | A | * | 8/1972 | Johnson .................... 188/251 R |
| 5,639,804 | A | * | 6/1997 | Yesnik ......................... 523/156 |
| 5,676,577 | A |   | 10/1997 | Lam et al. |
| 6,316,083 | B1 |  | 11/2001 | Kawabata et al. |
| 2006/0124419 | A1 | * | 6/2006 | Kinoshita et al. ............ 192/3.29 |

FOREIGN PATENT DOCUMENTS

| | | |
|---|---|---|
| JP | 04-142388 | 5/1992 |
| WO | WO 2009026129 A2 * | 2/2009 |

* cited by examiner

*Primary Examiner* — Michael Pepitone
(74) *Attorney, Agent, or Firm* — Davidson, Davidson & Kappel, LLC

(57) ABSTRACT

A friction lining for a wet clutch, in particular for a converter lockup, the clutch containing the ingredients—cellulose fibers, aramid fibers, fillers and a bonding agent. To provide a cost-effective friction lining suitable for the application under the conditions of a converter lockup clutch, it is proposed to admix powdered nutshell of percentage weight between 1% and 40%.

10 Claims, 1 Drawing Sheet

FRICTION LINING FOR WET CLUTCH

Priority to U.S. Provisional Patent Application Ser. No. 61/208,747, filed Feb. 27, 2009, is claimed, the entire disclosure of which is hereby incorporated by reference herein.

The invention relates to friction lining for wet clutch in particular for a converter lockup clutch containing the ingredients—cellulose fibers, aramid fibers, fillers and bonding agent.

BACKGROUND

Friction linings with such compositions are known as the so-called paper-based linings for wet clutches. In this case, the friction lining manufactured by means of hot-pressing process from mixture of ingredients is bonded on a disk or piston and brought in contact with a metal surface of a mating disk or of another mating friction surface, under the formation of a frictional grip, thus closing the wet clutch. Under normal conditions in a wet clutch used as a converter lockup clutch, the friction lining is exposed to pressure up to 8 MPa, normally up to 4 MPa to close the converter lockup clutch. An operation in slip mode of the converter lockup clutch generates differential speeds of maximal 10 m/s and normally between 3 m/s and 6 m/s between the friction lining and the mating friction surface. Thus, temperatures of maximum 200° C. occur, but normally lower than 150° C. The bonding agent, for instance phenol resin is stable up to 400° C., cellulose fibers and aramid fibers are at least stable up to 250° C. For the fillers, the maximum operating temperatures of a converter lockup clutch are likewise not problematic.

SUMMARY OF THE INVENTION

An object of the present invention is to provide lower costs for such friction linings by retaining the suitability for the application in a converter lockup clutch or in comparable applications.

An embodiment of the present invention provides a friction lining for a wet clutch, particularly for a converter lockup clutch containing the ingredients cellulose fibers, aramid fibers, fillers and a bonding agent, wherein the friction lining is provided with powdered nutshells of a percentage weight between 1% and 40%.

DETAILED DESCRIPTION

Figure 1:
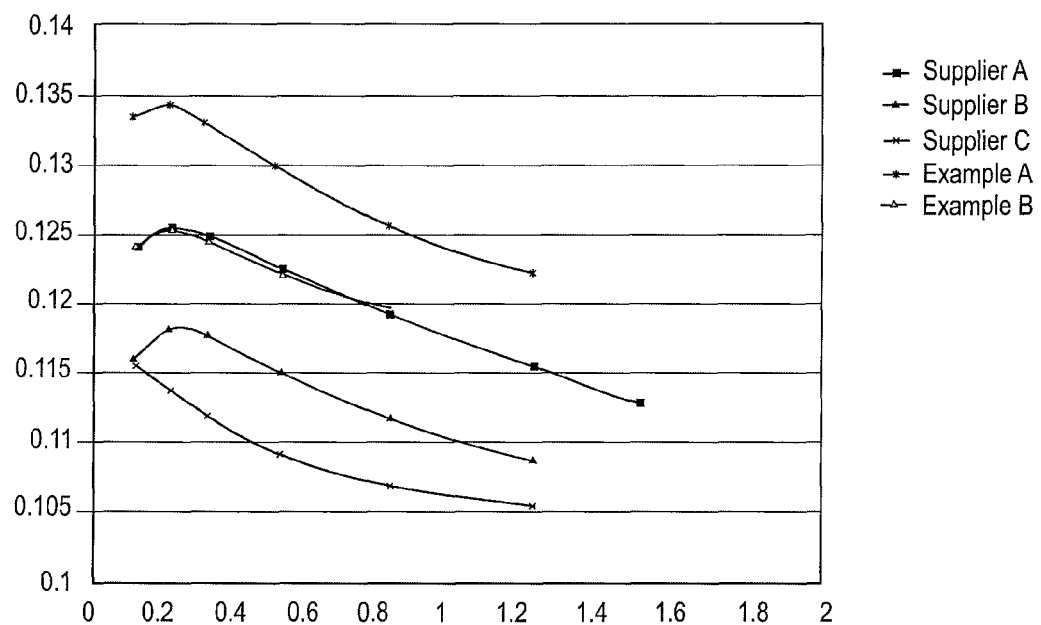
FIG. 1 shows friction performance of the present invention in comparison to commonly used friction material.

The present invention provides a friction lining for a wet clutch in particular for a converter lockup clutch, which contains the ingredients—cellulose fibers, aramid fibers, fillers and bonding agent—wherein the friction lining is provided with powdered nutshell between 1% and 40% percentage weight. It has been proven that powdered nutshell contributes advantageously to pressure stability and to the frictional coefficient and hence it can replace costly ingredients like fillers, cellulose and/or aramid fibers as cost-effective ingredients. Thus, it has been proven that previous formula proportions may be retained in their proportions and a corresponding percentage weight of powdered nutshell can be admixed, by reducing the other percentage weights.

Powdered coconut shells available commercially under the name coconut have proven as particularly advantageous due to their ingredients.

Furthermore, the use of fillers like amorphized silicon dioxide, for instance, in the form of diatomaceous earth, with a percentage weight between 15% and 45%, silicon carbide with a percentage weight less than or equal to 2%, and/or zeolite with a percentage weight between 5% and 10% is advantageous in a particularly advantageous combination with powdered nutshell. Thus, in special cases a cost-effective formula can be advantageous exclusively without powdered nutshell under the application of 0.5% to 1% percentage weight of silicon carbide and 6% to 10% percentage weight of zeolite. The percentage weight of phenol resin can be set at 15% to 45%, the percentage weight of cellulose fibers can be set between 30% and 60%.

The percentage weight of aramid fibers can lie between 10% and 20%. In combination with the percentage weight of the prior described ingredients as ingredients, it was proven particularly advantageous when aramid fibers featured short fiber length, to achieve an open pores structure of the friction lining characterized by a CSF value (Canadian Standard Freeness Value) between 550 and 650. Adequate resistance to pressure, adequate coefficient of friction and adequate temperature stability are achieved particularly with contents of zeolite and silicon carbide or powdered nutshell for applications of the friction lining in a converter lockup clutch or in similar wet clutch applications.

The following compositions have proven advantageous particularly by specifying the percentage weights:
- 11% to 12% aramid fibers,
- 33% to 34% cellulose fibers,
- 15% to 16% amorphous silicon dioxide,
- 15% to 16% powdered coconut shells,
- 24% to 25% phenol resin.
- 11% to 12% aramid fibers,
- 33% to 34% cellulose fibers,
- 22% to 23% amorphous silicon dioxide,
- 7% to 8% powdered coconut shells,
- 24% to 25% phenol resin.

Three additional example formulations are shown in Table 1 below:

TABLE 1

| Ingredients (%) | Material A | Material B | Material C |
| --- | --- | --- | --- |
| Aramid Fibers (Low fibrillation, CSF 550-650) | 15 | 15 | 15 |
| Cellulose Fibers | 45 | 44 | 45 |
| Diatomaceous earth | 30 | 30 | 20 |
| Cashew Dust | 10 | — | — |
| Zeolite | — | 9 | — |
| Silicon Carbide | — | 1 | — |
| Coconit | — | — | 20 |
| Phenolic Resin (Add-on) | 33 | 33 | 33 |

Low Energy Engagement (LEE) tests were conducted on all materials of Table 1. The test condition for LEE is a 12.5 kgm2 inertia stop at 1.7 MPa facing pressure and 200 RPM initial speed. Materials A and B showed improved friction performance than a commonly used commercially available friction material used in production applications, as shown in FIG. 1. The formulations of material A and B seemed suitable for TCC applications. Comparatively material B showed better performance than material A. The use of zeolite, as uniformly distributed throughout the friction materials, seemed favorable.

Figure 2:
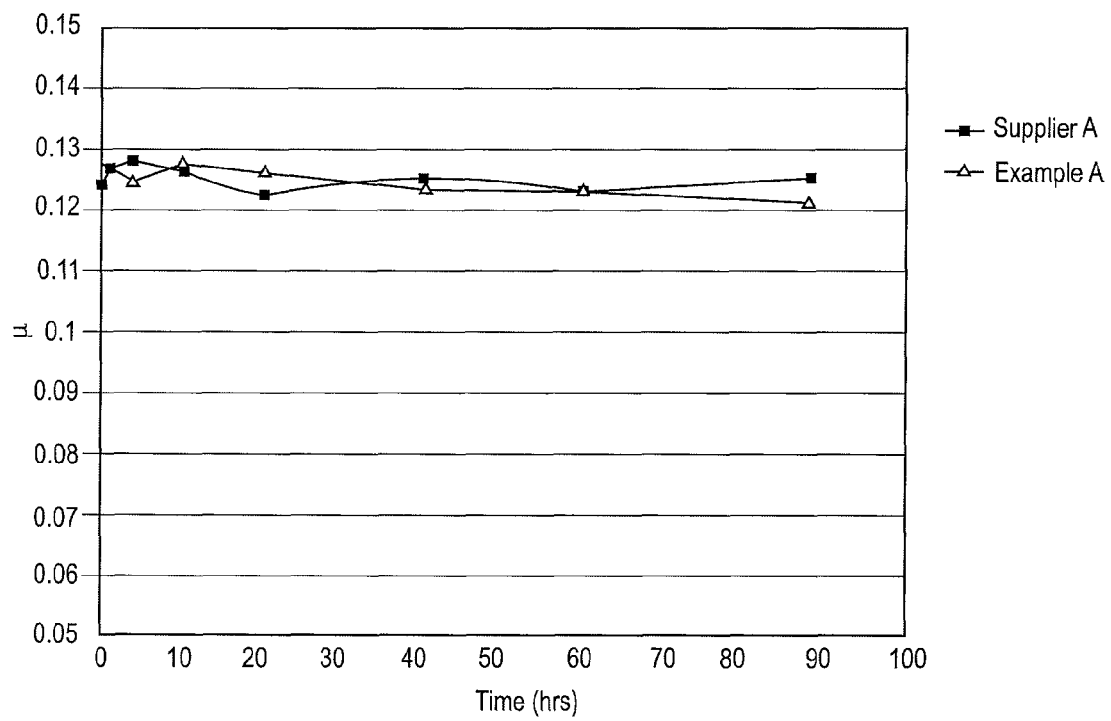
FIG. 2 shows a comparison of the present invention with competitor materials.

Materials A and B showed negligible wear in continuously slipping tests. Two such tests were conducted at 1.7 MPa facing pressure. An 88 hour duration test was run at 30 RPM slip speed and 1.7 MPa facing pressure. FIG. 2 compares Example A and Supplier A which is the best performer among competitor materials.

What is claimed is:

1. A friction lining for a wet clutch consisting essentially of cellulose fibers, aramid fibers, fillers and a bonding agent, wherein the friction lining is provided with powdered nutshells of a percentage weight between 1% and 40%, wherein the bonding agent is a phenol resin add-on with a percentage weight between 15% and 40%, wherein the percentage weight of the cellulose fibers is 30% and 60%, wherein the percentage weight of the aramid fibers is 10% to 20%, wherein the powdered nutshells are coconut shells.

2. The friction lining as recited in claim 1 wherein the aramid fibers feature a CSF-value between 550 and 650.

3. The friction lining as recited in claim 1 wherein the wet clutch is part of a converter lockup clutch.

4. The friction lining as recited in claim 1 wherein the fillers are amorphized silicon dioxide with a percentage weight between 15% and 45%, silicon carbide with a percentage weight less than or equal to 2%, and/or zeolite with a percentage weight between 5% and 10%.

5. A friction lining for a wet clutch comprising cellulose fibers, aramid fibers, fillers and a bonding agent, wherein the bonding agent is a phenol resin add-on with a percentage weight between 15% and 40%, wherein the percentage weight of the cellulose fibers is 30% and 60%, wherein the percentage weight of the aramid fibers is 10% to 20%, wherein the fillers are amorphized silicon dioxide with a percentage weight between 15% and 45%, silicon carbide with a percentage weight less than or equal to 2%, and zeolite with a percentage weight between 5% and 10%.

6. The friction lining as recited in claim 5 further comprising powdered nutshells of a percentage weight between 1% and 40%.

7. The friction lining as recited in claim 5 wherein the silicon carbide has a percentage weight of 0.5% to 1% and the zeolite has a percentage weight of 6% to 10%.

8. The friction lining as recited in claim 5 wherein the amorphized silicon dioxide is diatomaceous earth and the aramid fibers have a percentage weight of 15%, the cellulose fibers have a percentage weight of 44%, the diatomaceous earth has a percentage weight of 30%, the zeolite has a percentage weight of 9%, the silicon carbide has a percentage weight of 1% and the phenolic resin add-on has a percentage weight of 33%.

9. A friction lining for a wet clutch comprising the following percentage weights:
   11% to 12% aramid fibers,
   33% to 34% cellulose fibers,
   15% to 16% amorphous silicon dioxide,
   15% to 16% powdered coconut shells, and
   24% to 25% phenol resin.

10. A friction lining for a wet clutch comprising the following percentage weights:
   11% to 12% aramid fibers,
   33% to 34% cellulose fibers,
   22% to 23% amorphous silicon dioxide,
   7% to 8% powdered coconut shells, and
   24% to 25% phenol resin.

* * * * *